(12) United States Patent
Takishita et al.

(10) Patent No.: US 8,988,313 B2
(45) Date of Patent: Mar. 24, 2015

(54) ELECTRONIC DEVICE

(75) Inventors: Keiji Takishita, Daito (JP); Kimiko Kitazawa, Daito (JP); Tomoaki Suga, Daito (JP)

(73) Assignee: KYOCERA Corporation, Kyoto (JP)

( * ) Notice: Subject to any disclaimer, the term of this patent is extended or adjusted under 35 U.S.C. 154(b) by 559 days.

(21) Appl. No.: 13/302,847

(22) Filed: Nov. 22, 2011

(65) Prior Publication Data

US 2012/0133674 A1 May 31, 2012

(30) Foreign Application Priority Data

Nov. 25, 2010 (JP) .................................. 2010-262863
Dec. 15, 2010 (JP) .................................. 2010-279644

(51) Int. Cl.
*G09G 5/00* (2006.01)
*G06F 3/14* (2006.01)

(52) U.S. Cl.
CPC ............ *G06F 3/1446* (2013.01); *G06F 3/1423* (2013.01); *G09G 2320/08* (2013.01); *G09G 2340/14* (2013.01)
USPC ........................................................ 345/1.3

(58) Field of Classification Search
CPC   G06F 3/1446; G06F 3/147; G09F 2310/0232
USPC ........................................................ 345/1.3
See application file for complete search history.

(56) References Cited

U.S. PATENT DOCUMENTS

| | | | |
|---|---|---|---|
| 6,583,771 B1 * | 6/2003 | Furuhashi et al. | 345/1.1 |
| 7,489,286 B2 * | 2/2009 | Kawase et al. | 345/1.1 |
| 8,514,234 B2 * | 8/2013 | Miceli | 345/539 |
| 2002/0021296 A1 | 2/2002 | Tsuji et al. | |
| 2009/0096711 A1 * | 4/2009 | Jang et al. | 345/1.3 |
| 2009/0109125 A1 * | 4/2009 | Young et al. | 345/1.3 |
| 2010/0001925 A1 * | 1/2010 | Kim et al. | 345/1.3 |
| 2010/0321275 A1 * | 12/2010 | Hinckley et al. | 345/1.3 |
| 2011/0109526 A1 * | 5/2011 | Bauza et al. | 345/1.3 |
| 2011/0164065 A1 * | 7/2011 | Mate et al. | 345/676 |

FOREIGN PATENT DOCUMENTS

| | | |
|---|---|---|
| JP | 04-260096 | 9/1992 |
| JP | 2001-117750 A | 4/2001 |

(Continued)

OTHER PUBLICATIONS

Office Action dated Apr. 8, 2014 issued for counterpart Japanese patent application No. 2010-279644.

(Continued)

*Primary Examiner* — Hau Nguyen
*Assistant Examiner* — Ryan M Gray
(74) *Attorney, Agent, or Firm* — Procopio, Cory, Hargeaves & Savitch, LLP.

(57) ABSTRACT

A preferred embodiment of the present invention provides an electronic device in which a status, in which an image in a boundary region between image displaying parts is not or hardly seen, is solved in an electronic device in which a large screen is constructed by a plurality of image displaying parts. The electronic device has a display function that displays image data of a region whose width is defined by the predetermined number of pixels in one of displaying parts with respect to the image data on a boundary region where the image cannot be displayed when first and second displaying parts are used as one displaying part.

14 Claims, 16 Drawing Sheets

(56) References Cited

FOREIGN PATENT DOCUMENTS

| | | |
|---|---|---|
| JP | 2001-184187 A | 7/2001 |
| JP | 2002-006822 A | 1/2002 |
| JP | 2000-321597 A | 11/2002 |
| JP | 2003-280623 A | 2/2003 |
| JP | 2004-151136 A | 5/2004 |
| JP | 2006-98556 A | 4/2006 |
| JP | 2006-318239 A | 11/2006 |
| JP | 2006-319554 A | 11/2006 |
| WO | WO 2010082800 A2 * | 7/2010 |

OTHER PUBLICATIONS

Office Action dated Dec. 9, 2014 issued in counterpart Japanese application No. 2010-279644.

* cited by examiner

F I G. 5
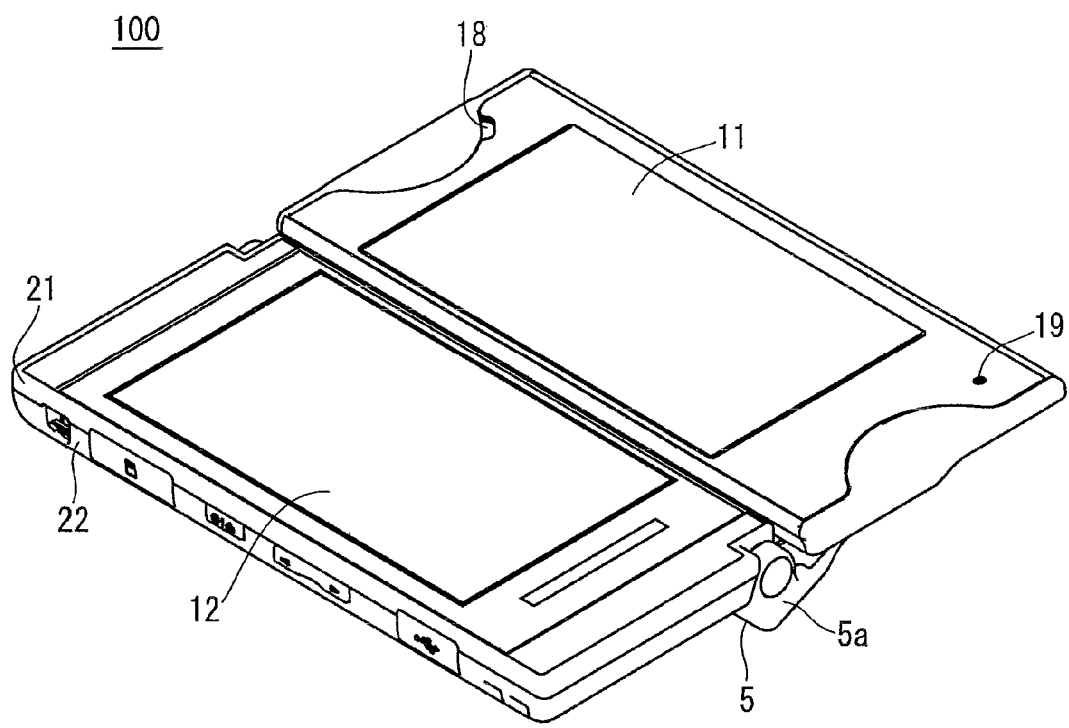

F I G. 6
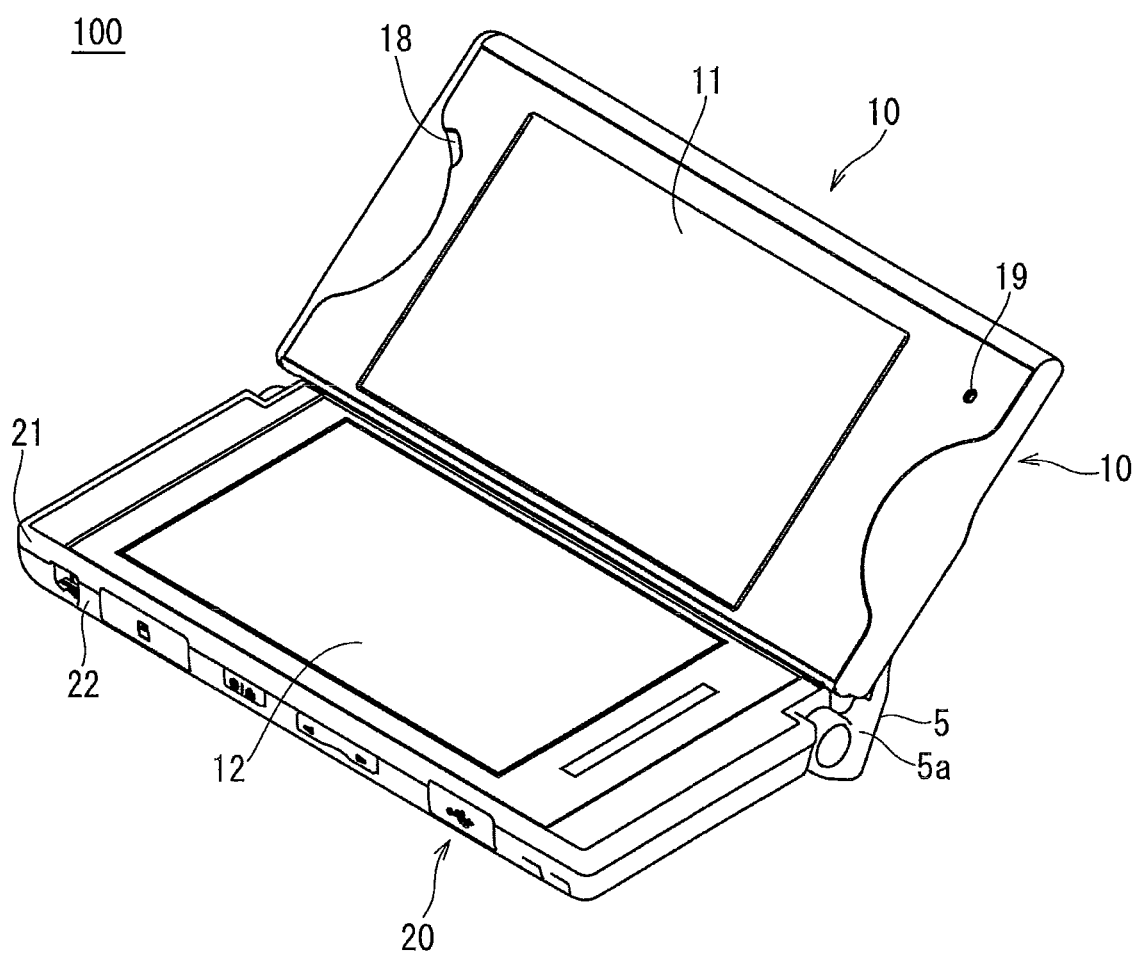

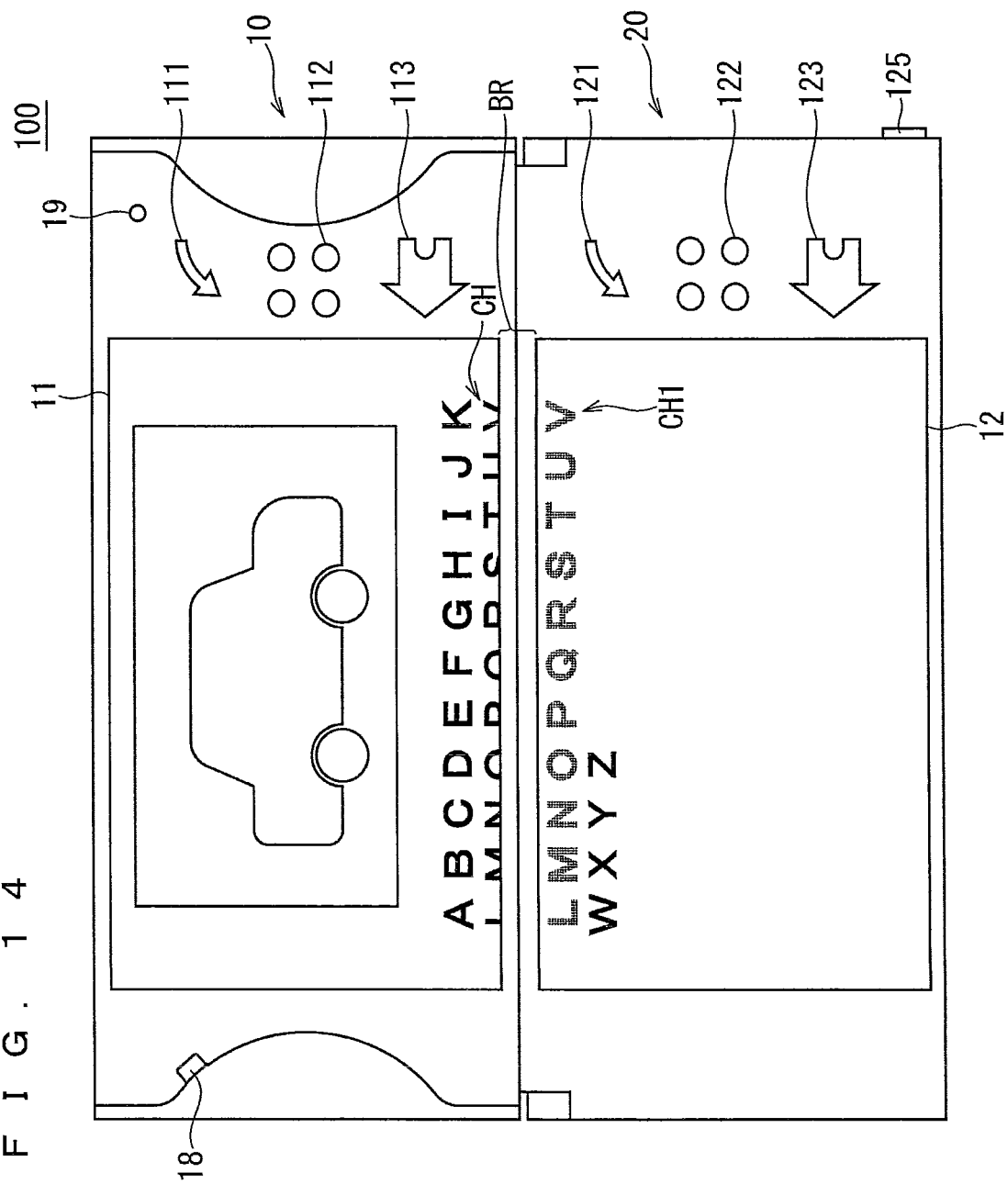

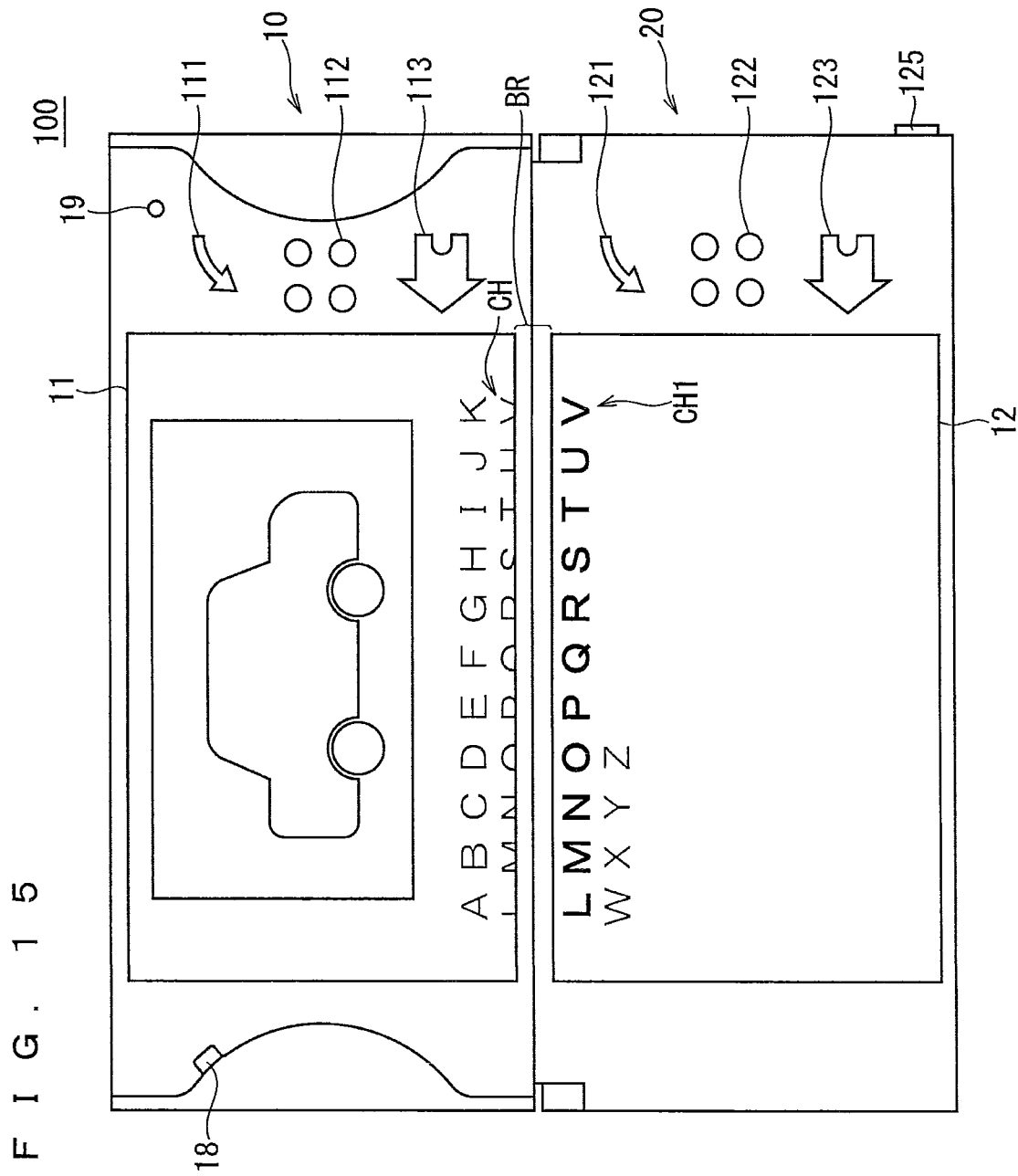

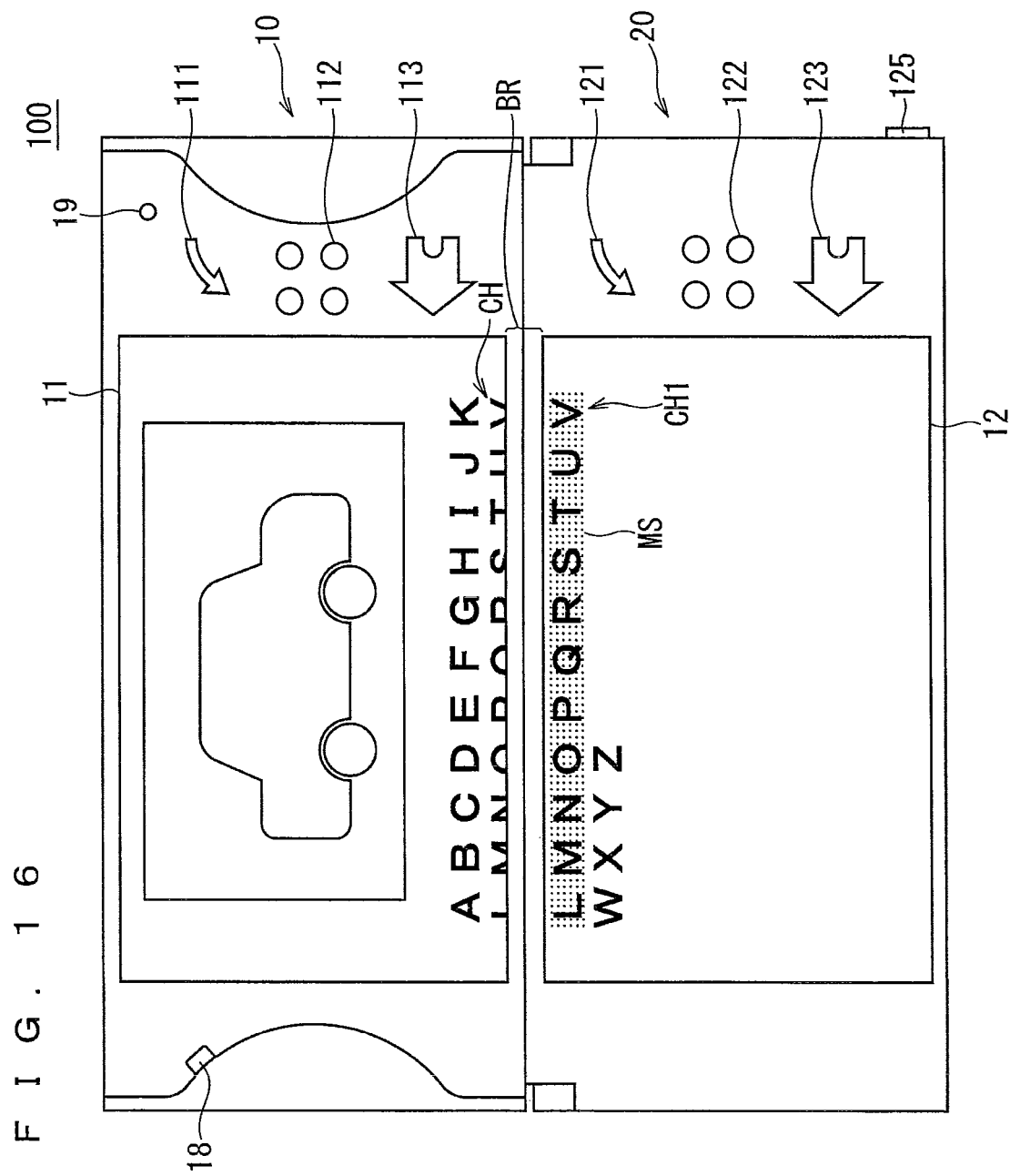

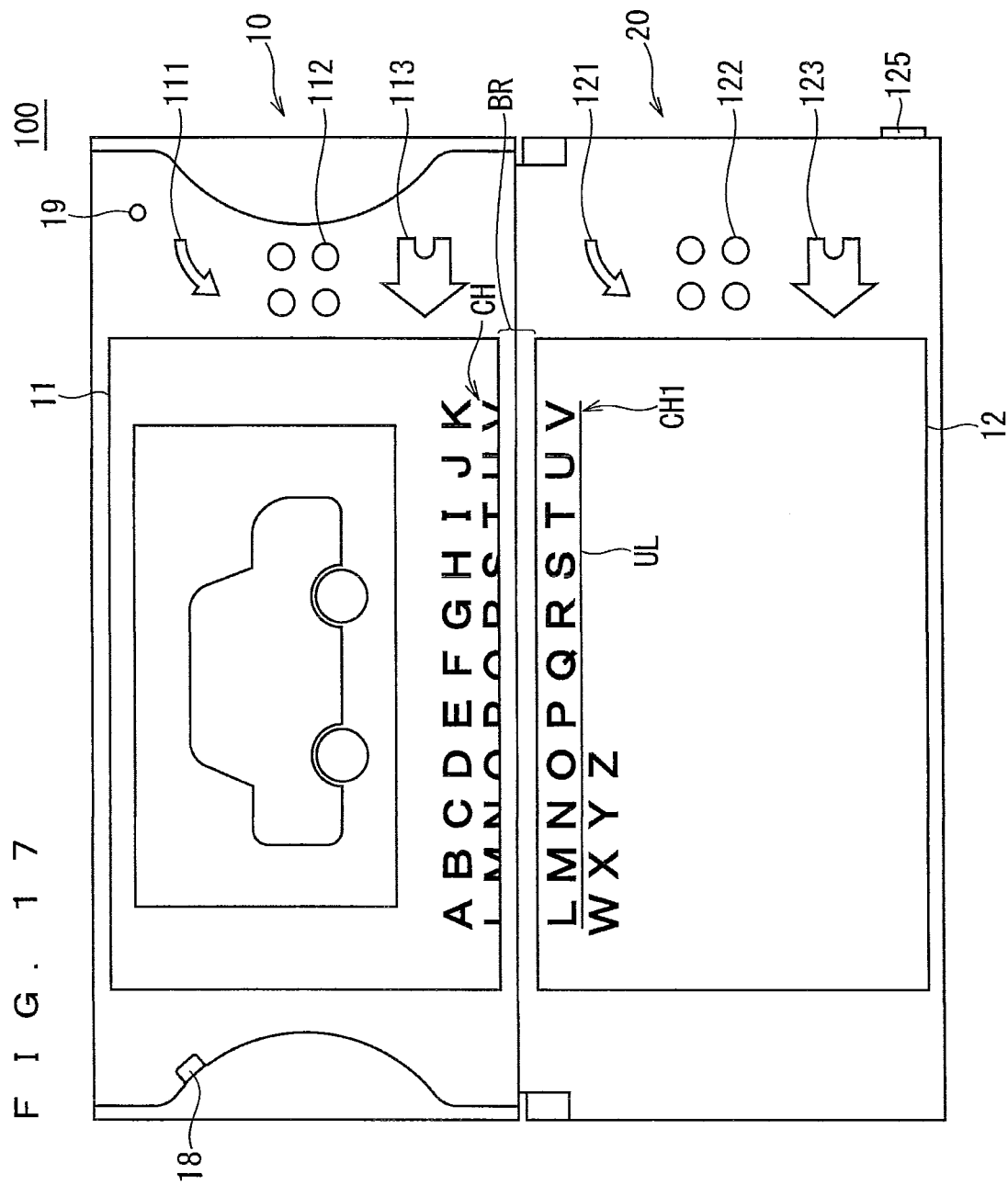

ELECTRONIC DEVICE

This application is based on application Nos. JP2010-262863 and JP2010-279644 filed in Japan, the contents of which are hereby incorporated by reference.

BACKGROUND OF THE INVENTION

1. Field of the Invention

The present invention relates to an electronic device, particularly to an electronic device including a plurality of image displaying parts.

2. Description of the Background Art

In the case that a large screen is constructed by horizontally and vertically arraying a plurality of image display devices such as liquid crystal displays, a boundary region where an image cannot be displayed is generated between the liquid crystal displays. In the case that the image is displayed on the large screen, when image data is displayed while simply divided in each display, the image is seen while extended by a width of the boundary region in portions which the boundary region is interposed between.

In order to avoid the state, there is adopted a method for suppressing the extension of the image by performing a correction for deletion of the image data near the boundary region between the liquid crystal displays. However, when the correction is performed, unfortunately the important image data that exists near the boundary region partially or completely becomes invisible.

In order to solve the problem, for example, Japanese Patent Application Laid-Open No. 2000-321597 discloses a configuration in which a dot-matrix LED is disposed in the boundary region to display the image data that is supposed to be deleted by the boundary region.

Recently the mobile electronic device such as a portable game machine including the plurality of image displaying parts is developed, and the large screen is configured such that the plurality of image displaying parts are disposed to construct the same plane. In the configuration, there is also generated a problem in that the image is not seen near the boundary region. The configuration of Japanese Patent Application Laid-Open No. 2000-321597 is hardly adopted in the mobile electronic device, which results in the problem in that the necessary image is not or hardly seen near the boundary region.

SUMMARY OF THE INVENTION

An electronic device according to one aspect of the present invention includes a plurality of displaying parts and a controller that controls the plurality of displaying parts, wherein the controller controls the plurality of displaying parts so that one of the plurality of displaying parts displays the image data which is to be displayed on a boundary region between the plurality of the displays, when the plurality of displaying parts are arrayed to construct an identical plane and is used as one displaying part.

According to the aspect of the present invention, the necessary information can be prevented from being invisible behind the boundary region.

In another aspect of the present invention, the image data which the one of the plurality of the display parts displays is on a region whose width is defined by the predetermined number of pixels.

In another aspect of the present invention, the predetermined number of pixels is the number of pixels corresponding to at least the width of the boundary region.

In another aspect of the present invention, the predetermined number of pixels is the number of pixels corresponding to a display size of one character of character data when the image data which is to be displayed on the boundary region is the character data.

In another aspect of the present invention, the predetermined number of pixels can be set to any value.

In another aspect of the present invention, the controller can control the plurality of displaying parts so that the one of the plurality of displaying parts displays the image data which is to be displayed on the boundary region in an invisible state, and can control the plurality of displaying parts so that the image data near the boundary region is deleted, wherein, when the process in which the controller controls the plurality of displaying parts so that one of the plurality of displaying parts displays the image data which is to be displayed on a boundary region is called as a first process, the process in which the controller controls the plurality of displaying parts so that the one of the plurality of displaying parts displays the mage data which is to be displayed on the boundary region in an invisible state is called as a second process, and the process in which the controller controls the plurality of displaying parts so that the image data near the boundary region is deleted is called as a third process, the electronic device further comprises a process selecting part for selecting one of the first process, the second process and the third process.

In another aspect of the present invention, the process selecting part is a selector switch.

In another aspect of the present invention, the process selecting part is a process selection screen displayed on one of the plurality of displaying parts.

In another aspect of the present invention, the electronic device can execute each of a plurality of applications associated with one of the first process, the second process and the third process, the controller automatically selects one of the first process, the second process and the third process based on the application which the electronic device executes.

In the another aspect of the present invention, when the image data which is to be displayed on the boundary region is character data, the one of the plurality of the displaying parts displays a character of character data so that the character of character data can visually discriminate another character of character data.

In another aspect of the present invention, an electronic device includes a plurality of displaying parts, wherein one of the plurality of the displaying parts displays an image data which is to be displayed on a boundary region between the plurality of the displays, when the plurality of displaying parts are arrayed to construct an identical plane and is used as one displaying part.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 and 6 are perspective view illustrating an appearance of the mobile wireless terminal according to the preferred embodiment of the present invention in an opened state;

FIGS. 14 to 17 are views illustrating an example in which an overlap point is displayed by a visually discriminable method.

DESCRIPTION OF THE PREFERRED EMBODIMENT

Tiled Display and Multi-Display

Definitions of a tiled display and a multi-display will be described prior to description of an embodiment of the present invention.

Figure 1:
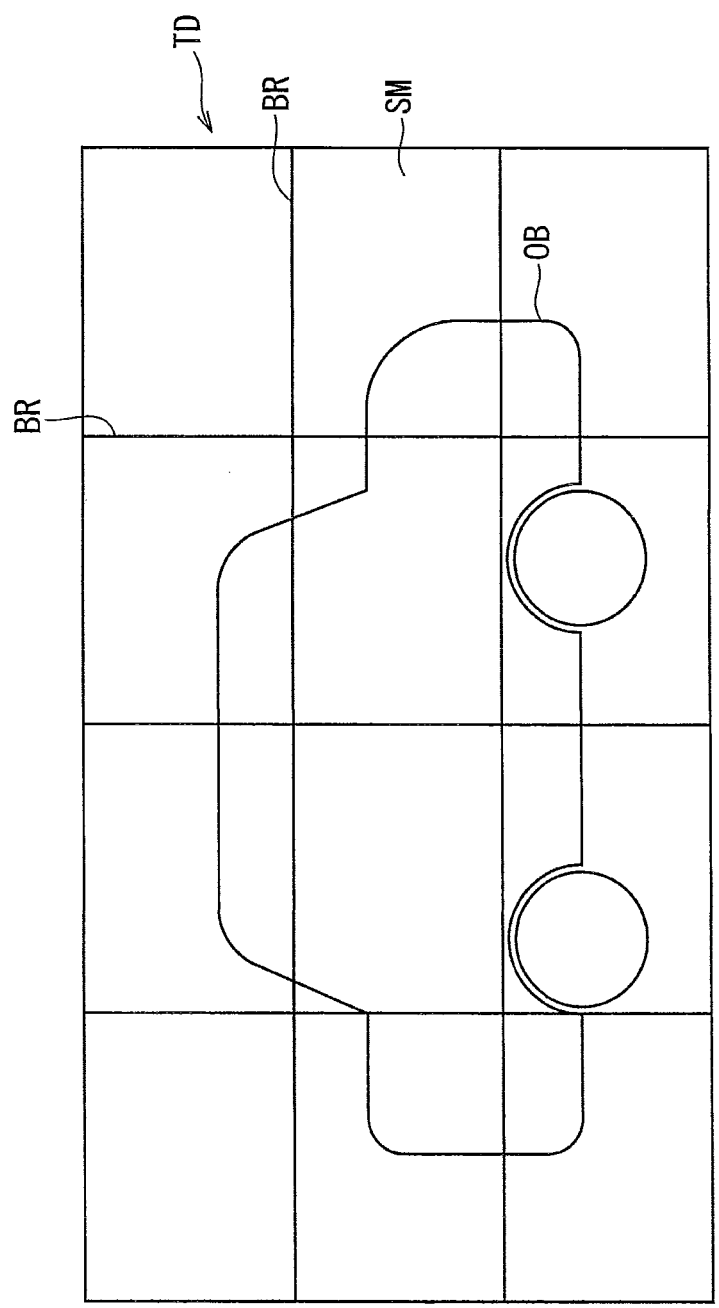
FIG. 1 is a view illustrating tiled display.

FIG. 1 illustrates what is called a tiled display in which a large screen is constructed by horizontally and vertically arraying a plurality of image display devices, and the configuration of Japanese Patent Application Laid-Open No. 2000-321597 corresponds to the tiled display of FIG. 1.

As illustrated in FIG. 1, in a tiled display TD, a plurality of image display devices SM are horizontally and vertically arrayed, and an image OB is displayed on the whole surface of the screen. Although the image OB is displayed so as to stride over a boundary region BR between the image display devices SM, the image OB is prevented from extending because image data is corrected near the boundary region BR between the image display devices SM.

Figure 2:
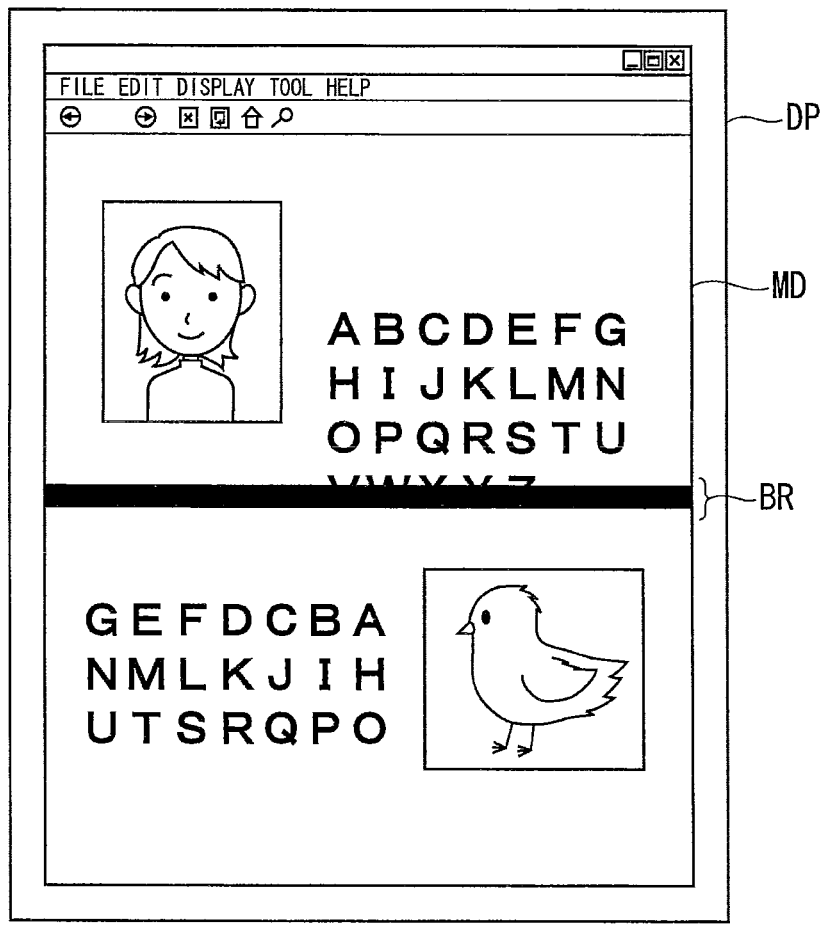
FIG. 2 is a view illustrating multi-display.

FIG. 2 illustrates what is called a multi-display in which a plurality of screens are displayed in one image displaying part DP.

As illustrated in FIG. 2, in a multi-display MD, because the plurality of screens are displayed in one image displaying part DP, sometimes the image is not seen in the boundary region BR between the screens. However, the portion in which the image is not seen can be displayed by a manipulation that scrolls the screen. Therefore, the portion in which the image is not seen is displayed while directly not seen, and the processing of deleting the image data near the boundary region BR to prevent the extension of the image is not performed.

The embodiment of the present invention will be described while the tiled display and the multi-display are defined as described above.

Embodiment

An openable mobile wireless terminal including two image displaying parts will be described below as an embodiment of the present invention. The present invention is not limited to the mobile wireless terminal, but the invention can be applied to any mobile wireless terminal as long as the mobile wireless terminal includes at least two image displaying parts to construct the large screen by the image displaying parts. The present invention can also be applied to electronic devices such as a portable game machine and a PDA (Personal Digital Assistant).

<Appearance Configuration>

Figure 3:
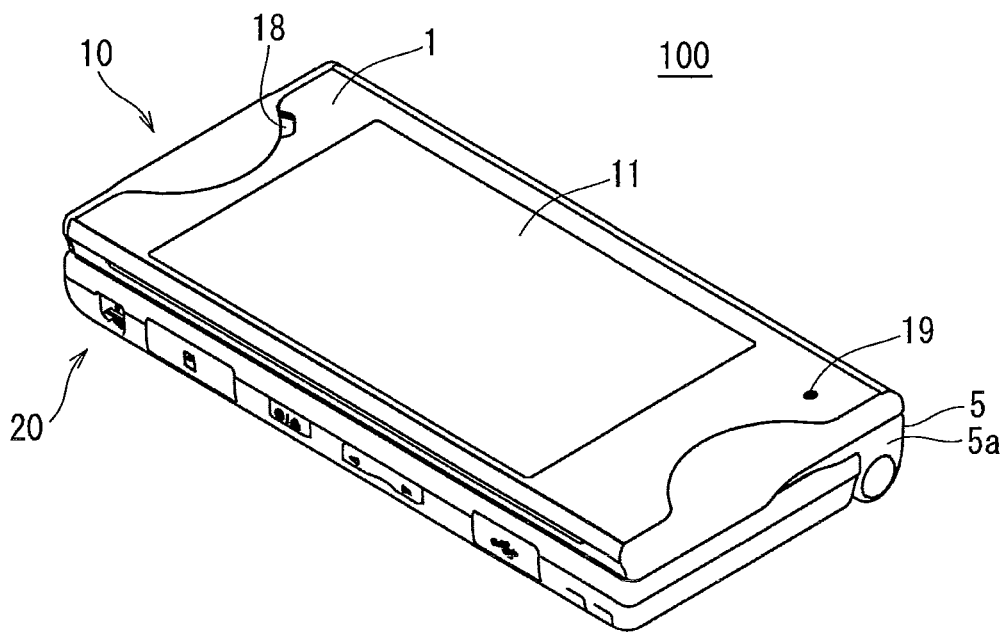
FIGS. 3 and 4 are perspective views illustrating an appearance of a mobile wireless terminal according to a preferred embodiment of the present invention in a closed state.
Figure 4:
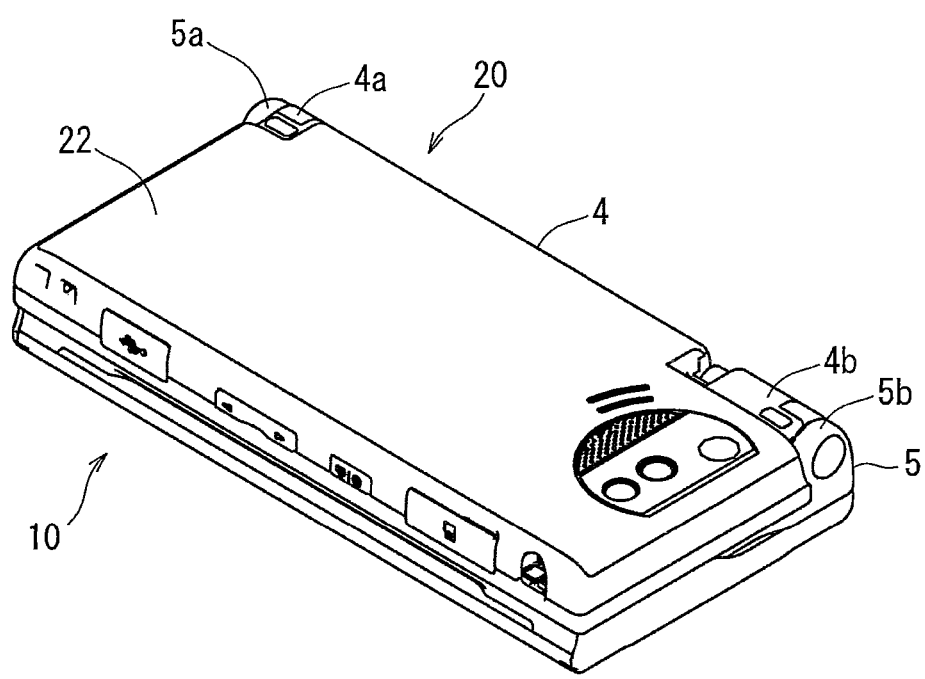

FIGS. 3 and 4 illustrate an appearance shape of a mobile wireless terminal 100 according to an embodiment of the present invention, FIG. 3 is a view illustrating the mobile wireless terminal 100 in a closed state when viewed from a side of a first chassis 10, and FIG. 4 is a view illustrating the mobile wireless terminal 100 in the closed state when viewed from a side of a second chassis 20.

As used herein, the closed state means that, as illustrated in FIGS. 3 and 4, the first chassis 10 and the second chassis 20 are disposed so as to overlap each other while a first displaying part 11 is exposed. In this case, because the first displaying part 11 of the first chassis 10 and a second displaying part 12 (FIG. 5) of the second chassis 20 overlap each other with a gap, it can be said that an angle formed between the first displaying part 11 and the second displaying part 12 is 0 degree.

FIGS. 5 and 6 illustrate the mobile wireless terminal 100 in an opened state when viewed from the sides of the first displaying part 11 and the second displaying part 12, FIG. 5 illustrates the mobile wireless terminal 100 in the opened state such that the first displaying part 11 and the second displaying part 12 constitute the same plane, and FIG. 6 illustrates the mobile wireless terminal 100 in the opened state such that the first displaying part 11 and the second displaying part 12 form a predetermined angle smaller than 180 degrees.

As used herein, the opened state with the predetermined angle means that, as illustrated in FIGS. 5 and 6, the first chassis 10 and the second chassis 20 are disposed such that the first displaying part 11 of the first chassis 10 and the second displaying part 12 of the second chassis 20 form an angle larger than 0 degree, and a transition state to the states illustrated in FIGS. 5 and 6 is also included in the opened state.

As illustrated in FIGS. 3 to 6, the first chassis 10 and the second chassis 20 are coupled to each other while a hinge 4 and an arm 5 are interposed therebetween. The hinge 4 provided on the side of the second chassis 20 couples the arm 5 to the second chassis 20 while the angle can be changed, and the hinge 4 couples the arm 5 to the first chassis 10 while the angle can be changed. Therefore, the first chassis 10 can be moved from the state, in which the first chassis 10 is located on the second chassis 20 while the first displaying part 11 is exposed as illustrated in FIG. 1, such that the first displaying part 11 of the first chassis 10 and the second displaying part 12 of the second chassis 20 constitute the same plane as illustrated in FIG. 3.

Configurations of the hinge 4 and the arm 5 will be described. As illustrated in FIG. 5, an outer surface of the second chassis 20 is constructed by a combination of a front case 21 and a rear case 22. The second chassis 20 includes not only the second displaying part 12 on the side of the front case 21, but also the hinge 4, and a first retaining part 4a and a second retaining part 4b, which retain the hinge 4 from both sides in a rotation-axis direction as illustrated in FIG. 4. A first arm 5a and a second arm 5b engage the first retaining part 4a and the second retaining part 4b on the outside in the rotation-axis direction, respectively to be coaxial with a rotational axis of the hinge 4. The first arm 5a and the second arm 5b are integrated with a beam (not illustrated), and the arm 5 is configured to include the first arm 5a, the second arm 5b, and the beam.

At this point, the first chassis 10 is constructed by a combination of a front case 1 (FIG. 3) including the first displaying part 11 and a rear case (not illustrated) that is a surface (hereinafter referred to as a rear surface) opposite the surface in which the first displaying part 11 is provided, and the beam (not illustrated) is provided so as to extend in a longitudinal direction of the first chassis 10 on the rear case side of the first chassis 10.

In the first arm 5a and the second arm 5b, portions opposite engaging parts that engage the first retaining part 4a and the second retaining part 4b engage the first chassis 10 in the rear surface of the first chassis 10, and the angle of the first chassis 10 can be changed because the first chassis 10 is configured to be able to rotate in the portions opposite the engaging parts.

A microphone 19 that is of a sound inputting part and a speaker 18 that is of a sound outputting part are accommodated in the first chassis 10, and the microphone 19 and the speaker 18 are provided near both end portions in the longitudinal direction of the surface in which the first displaying part 11 is exposed.

Each of the first displaying part 11 and the second displaying part 12 has a touch panel function, and the touch panel function is implemented by an electric configuration of the mobile wireless terminal 100.

<Electric Configuration>

Figure 7:
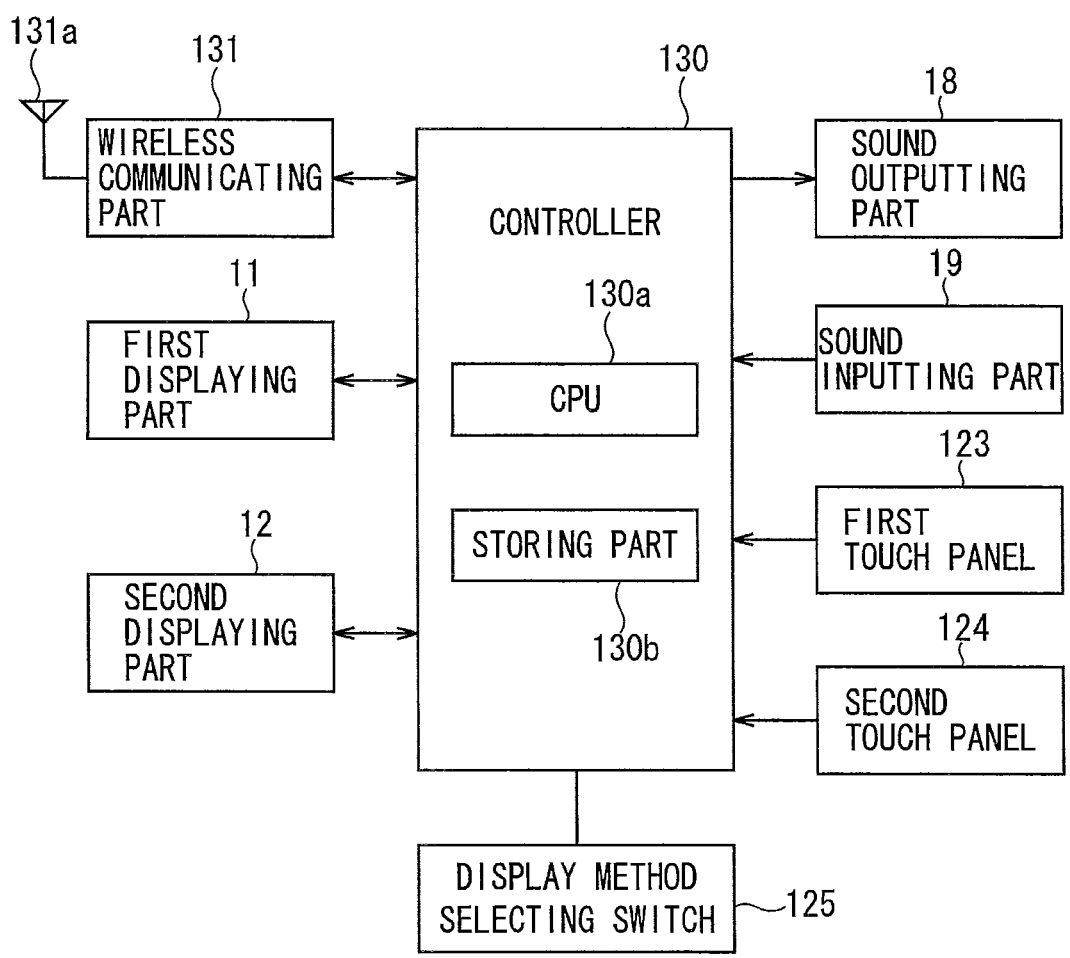
FIG. 7 is a view illustrating an electric configuration of the mobile wireless terminal according to the preferred embodiment of the present invention.

FIG. 7 is a block diagram illustrating an electric configuration of the mobile wireless terminal 100. As illustrated in FIG. 7, the mobile wireless terminal 100 includes the first displaying part 11, the second displaying part 12, the sound outputting part (speaker) 18, the sound inputting part (microphone) 19, a controller 130, a wireless communicating part 131, a first touch panel 123, and a second touch panel 124. For example, the controller 130 and the wireless communicating part 131 are accommodated in the second chassis 20.

The controller 130 includes a CPU 130a and a storing part 130b, and the controller 130 controls other components of the mobile wireless terminal 100 to wholly manage an operation of the mobile wireless terminal 100. The storing part 130b includes a ROM and a RAM. Functions of the controller 130 are implemented such that the CPU 130a executes various programs stored in the storing part 130b.

The wireless communicating part 131 receives a radio signal from a mobile wireless terminal except the mobile wireless terminal 100 or a communication device such as a web server connected to the Internet using an antenna 131a, and the wireless communicating part 131 performs amplification processing or down-conversion to the received signal and outputs the processed signal to the controller 130. The wireless communicating part 131 performs up-conversion or the amplification processing to a transmission signal generated by the controller 130, and the wireless communicating part 131 wirelessly transmits the processed transmission signal to a mobile wireless terminal except the mobile wireless terminal 100 or the communication device connected to the Internet through the antenna 131a.

The sound inputting part 19 converts externally-input sound into sound data and outputs the sound data to the controller 130. The sound outputting part 18 converts the sound data from the controller 130 into the sound and outputs the sound to the outside.

The first displaying part 11 and the second displaying part 12 display various pieces of information such as characters, symbols, and graphics under the control of the controller 130.

The first touch panel 123 and the second touch panel 124 express the first displaying part 11, the second displaying part 12, and a configuration that implements the touch panel function in peripheries of the first displaying part 11 and the second displaying part 12. The first touch panel 123 is provided in the first displaying part 11 and the periphery thereof, and a manipulation performed by an indicating body such as a user's finger is detected through the touch panel function of the first touch panel 123 and output to the controller 130. The second touch panel 124 is provided in the second displaying part 12 and the periphery thereof, and the manipulation performed by the indicating body such as the user's finger is detected through the touch panel function of the second touch panel 124 and output to the controller 130.

A display method selecting switch 125 described below is connected to the controller 130. When the display method is selected by the manipulation of the display method selecting switch 125, the CPU 130a executes the program corresponding to the display method selected from the programs of the plurality of display methods in the storing part 130b, and performs the displays on the first displaying part 11 and the second displaying part 12 according to the selected display method.

In the case that a method for selecting the display method using not the mechanical switch such as the display method selecting switch 125 but the first touch panel 123 and the second touch panel 124 is adopted, an instruction is issued to the controller 130 through the touch panel function, and the CPU 130a executes the program corresponding to the display method selected from the programs of the plurality of display methods in the storing part 130b, and performs the displays on the first displaying part 11 and the second displaying part 12 according to the selected display method.

As to the display method, the mobile wireless terminal 100 includes three kinds of display methods (display functions or processes), namely, a tiled mode in which the previously-defined tiled display is performed, a multi-mode in which the previously-defined multi-display is performed, and an overlap mode in which an overlap display is performed, and the mobile wireless terminal 100 selects one of the tiled mode, the multi-mode, and the overlap mode.

Display Example in Multi-Mode

An example in which the display is performed in the multi-mode using the first displaying part 11 and the second displaying part 12 of the mobile wireless terminal 100 will be described below with reference to FIG. 8.

Figure 8:
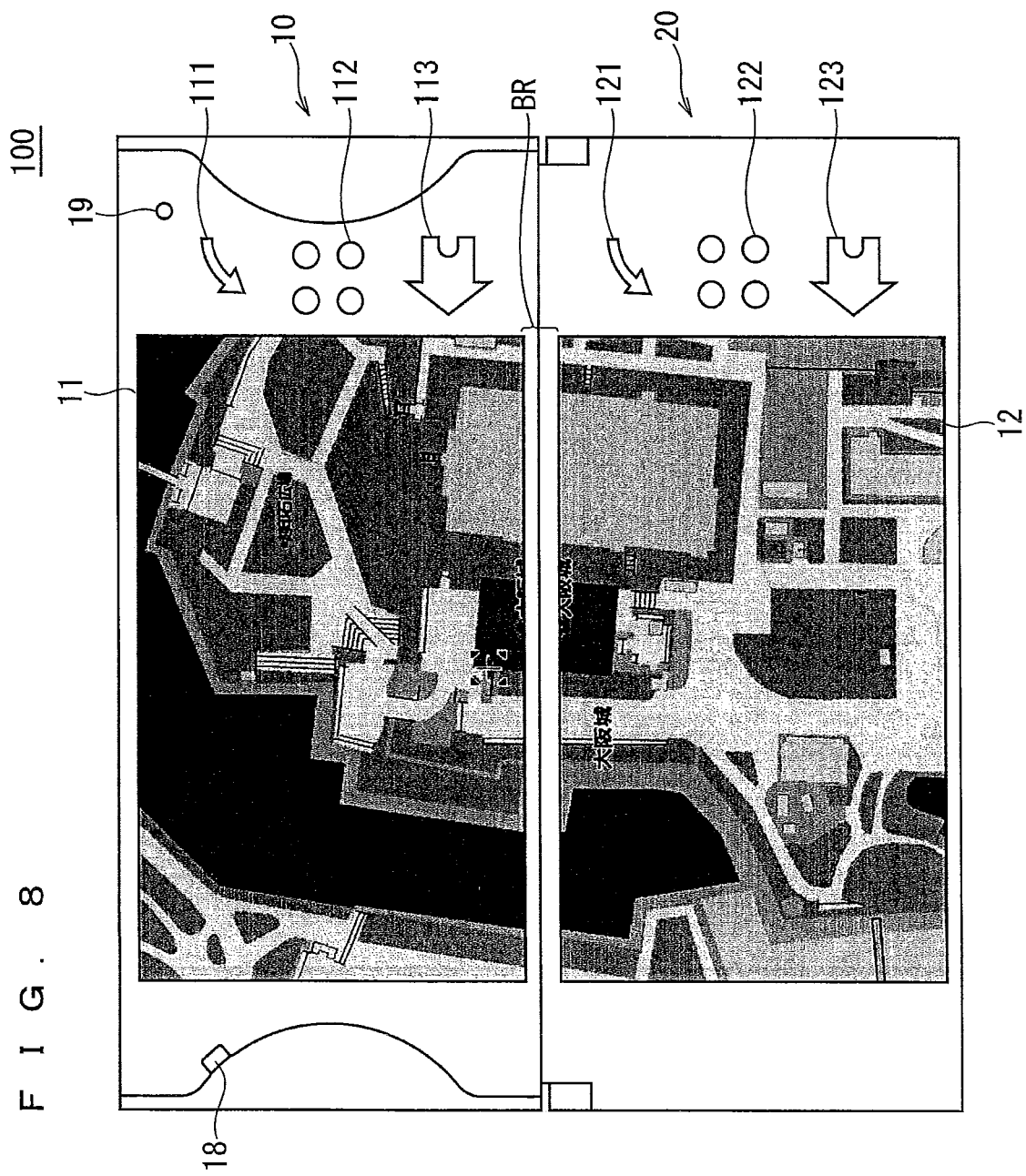
FIG. 8 is a view illustrating display in a multi-mode of the mobile wireless terminal according to the preferred embodiment of the present invention.

FIG. 8 illustrates the state in which the CPU130a of FIG. 7 executes the multi-display program in the storing part 130b to display the images on the first displaying part 11 and the second displaying part 12. In the state of FIG. 8, the mobile wireless terminal 100 is opened such that the first displaying part 11 and the second displaying part 12 constitute the same plane, long sides of the first chassis 10 and the second chassis 20 become horizontal, and the mobile wireless terminal 100 is used such that the second chassis 20 in which the second displaying part 12 is provided becomes a lower side while the first chassis 10 in which the first displaying part 11 is provided becomes an upper side.

Plural keys constructed by the first touch panel 123 are displayed on the outside of a short side of the first displaying part 11, where the microphone 19 of the first displaying part is provided. A back key 111 that returns to a previous screen, a menu key 112 that displays an optional menu corresponding to each screen, and a home key 113 that returns to a home screen are displayed in the example of FIG. 8. In the second displaying part 12, these keys are represented as a back key 121, a menu key 122, and a home key 123 by the second touch panel 124. The back key 111, the menu key 112, and the home key 113 are configured to function in the case that the mobile wireless terminal 100 is used in the closed state, and the back key 121, the menu key 122, and the home key 123 are configured to function in the case that the mobile wireless terminal 100 is used in the opened state. In FIG. 8, map images in a continuous area are displayed in the first displaying part 11 and the second displaying part 12, and the boundary region BR where the image cannot be displayed due to the existence of frames of the first chassis 10 and the second chassis 20 exists between the long side on the lower side of the first displaying part 11 and the long side on the upper side of the second displaying part 12.

As described above, when the display is performed in the multi-mode, the portion that is not seen is directly displayed invisible, and the image is seen while extended by the width of the boundary region BR because the image data is simply divided in each displaying part. However, in the map illustrated in FIG. 8, because information can be obtained as the map even if the image is slightly extended, there is no problem when the multi-mode is used.

Display Example in Tiled Mode

An example in which the display is performed in the tiled mode using the first displaying part 11 and the second displaying part 12 of the mobile wireless terminal 100 will be described below with reference to FIG. 9. The use mode of the mobile wireless terminal 100 is identical to that in the multi-mode of FIG. 8.

Figure 9:
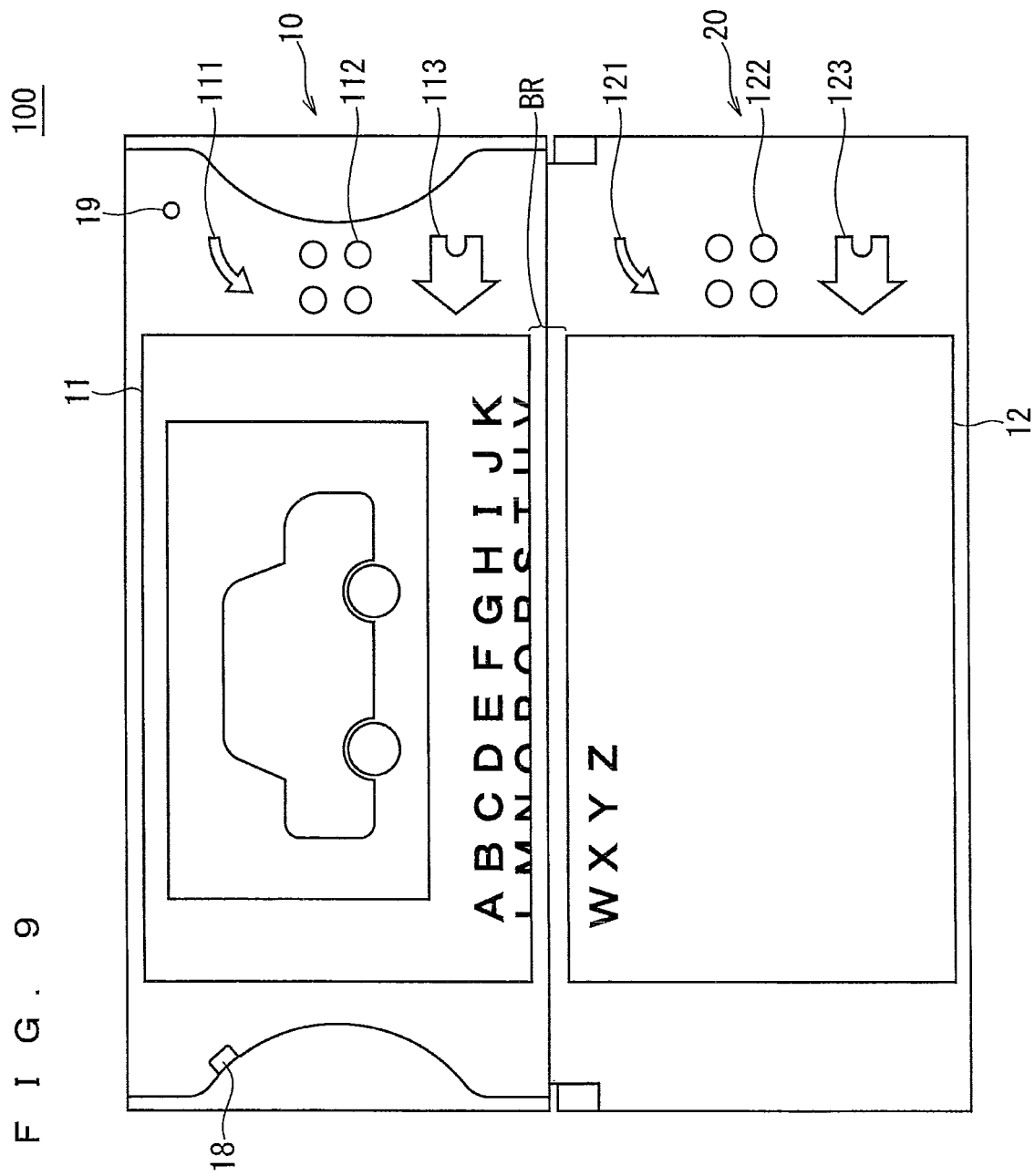
FIG. 9 is a view illustrating display in a tiled mode of the mobile wireless terminal according to the preferred embodiment of the present invention.

In FIG. 9, character images of a continuous explanatory text are displayed in the first displaying part 11 and the second displaying part 12. In the tiled mode, as described above, because the image data near the boundary region BR is corrected to suppress the extension of the image, a character string near the boundary region BR of the first displaying part 11 is deleted by the correction, and a lower half of the character string is not seen. The invisible portion depends on a size and position of the character, only an upper portion and a lower portion of the character are seen when the character has the size striding over the boundary region BR, and possibly the array of the characters is completely invisible when the array of the characters is located near the boundary region BR while the size of the character is lower than the width of the boundary region BR.

When the tiled mode is used in the image including the character string, sometimes the characters cannot be read.

On the other hand, when the multi-mode of FIG. 8 is used in the image including the character string, possibly the characters are hardly read because the characters are extended like the characters that are displayed while striding over the boundary region BR of FIG. 8.

Display Example in Overlap Mode

An example in which the display is performed in the overlap mode using the first displaying part 11 and the second displaying part 12 of the mobile wireless terminal 100 will be described below with reference to FIGS. 10 to 12. The use mode of the mobile wireless terminal 100 is identical to that in the multi-mode of FIG. 8.

Figure 10:
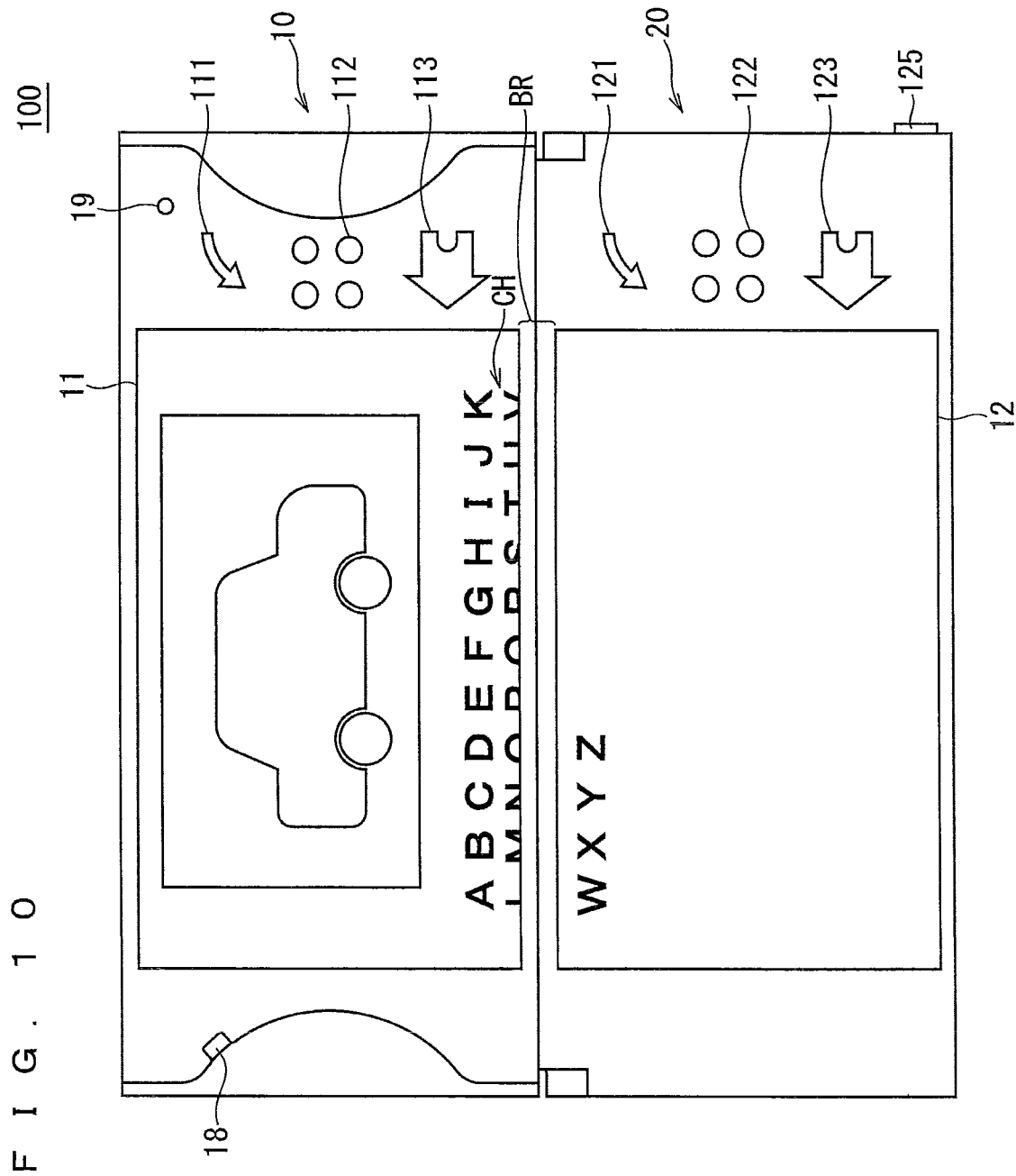
FIG. 10 is a view in the case that switching is performed from the tiled mode by a switch in the mobile wireless terminal according to the preferred embodiment of the present invention.

FIG. 10 illustrates a configuration in which the display method selecting switch 125 is provided as the display method selecting means for selecting one of the three kinds of the display methods, namely, the multi-mode, the tiled mode, and the overlap mode.

The display method selecting switch 125 is provided as a push-button switch in a side surface on one of the short-side sides of the second chassis 20, and the display method is switched by pushing the display method selecting switch 125.

For example, the display method illustrated in FIG. 10 is the tiled mode identical to that of FIG. 9. In the tiled mode, the lower half of the character string CH near the boundary region BR of the first displaying part 11 is not seen by the deletion in the correction. Therefore, the display method is changed to the display in the overlap mode by pushing the display method selecting switch 125.

Figure 11:
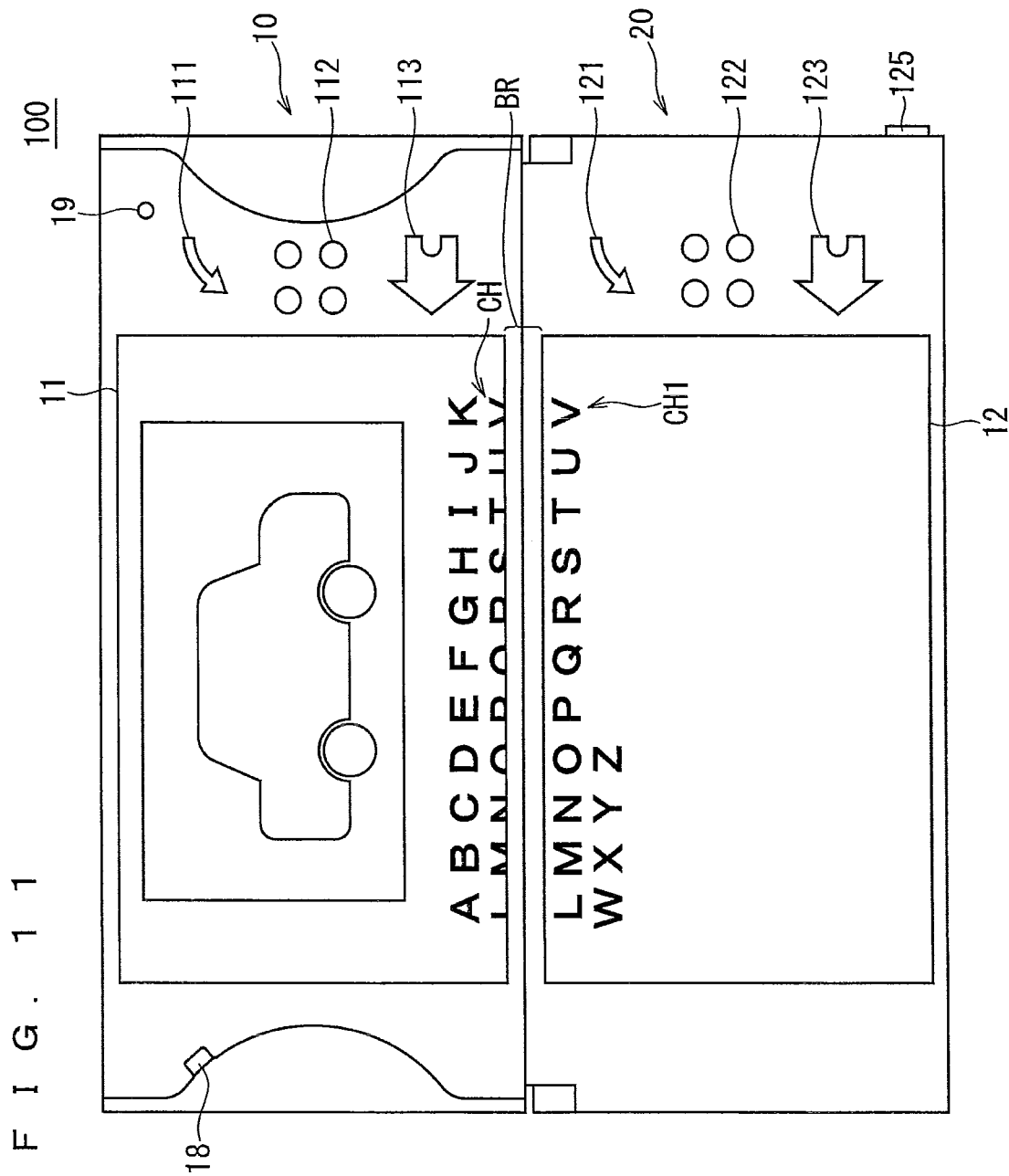
FIG. 11 is a view illustrating display in an overlap mode of the mobile wireless terminal according to the preferred embodiment of the present invention.

FIG. 11 illustrates the display in the overlap mode. As illustrated in FIG. 11, in the overlap mode, the lower half of the character string CH near the boundary region BR of the first displaying part 11 is not seen by the deletion in the correction, a character string CH1 in which the character string CH is completely displayed is displayed near the boundary region BR of the second displaying part 12. Accordingly, the character string CH that is not read in the tiled mode of FIG. 9 can be read as the character string CH1.

In the overlap mode, in the case that the image data on the boundary region BR exists in one set of displaying parts that is adjacent to each other while the boundary region BR is sandwiched therebetween, at least the image data in the region defined by the number of pixels corresponding to the width (a length between the displaying parts) of the boundary region BR is displayed while overlapping in one of the displaying parts, so that the necessary information can be prevented from being invisible behind the boundary region BR. In the display of FIG. 11, the width of the boundary region BR is larger than the display size of one character, and the image data in the whole range of the character string CH is displayed on the second displaying part 12.

In the case that the image data on the boundary region BR is the character data, for example, when one character of the character data has the display size of 16 dots, the image data in the region defined by the number of pixels corresponding to the display size of one character is displayed while overlapping in the other displaying part. When the overlap width is set to not a fixed value but an arbitrary value, not only the image including many pieces of character information but also various images can be dealt with.

The display can be implemented by the image processing performed by the controller 130 of FIG. 7. Based on the technique of correcting the image data in the boundary region BR, which is used in the tiled mode, the image data on the boundary region BR is detected, and the image data in the region whose width (a length in the same direction as the width direction of the boundary region BR) is defined by the predetermined number of pixels can be displayed while overlapping in the other displaying part.

There is no limitation to the kind of the switch. The display method selecting switch 125 may be constructed by a push-button switch in which display modes are sequentially changed by pushing the push-button switch, or a slide switch.

The display method selecting means is not limited to the mechanical switch such as the display method selecting switch 125 of FIG. 10, but means for selecting the display method by the touch panel function added to the first displaying part 11 and the second displaying part 12 may be adopted.

Figure 12:
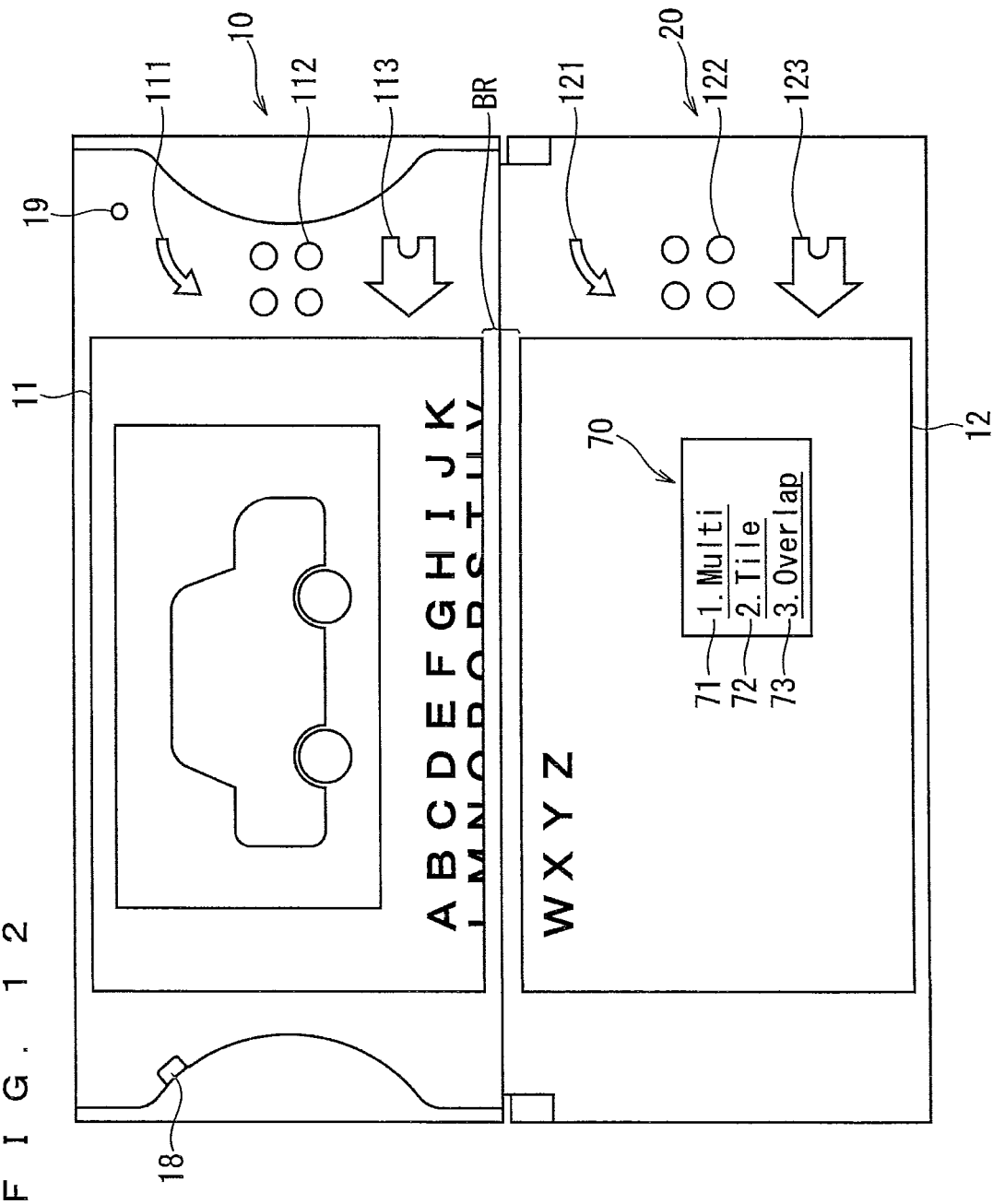
FIG. 12 is a view in the case that switching is performed from the overlap mode by a display screen in the mobile wireless terminal according to the preferred embodiment of the present invention.

The display method of FIG. 12 is the tiled mode identical to that of FIG. 9. In the tiled mode of FIG. 12, the lower half of the character string CH near the boundary region BR of the first displaying part 11 is not seen by the deletion in the correction. Therefore, a display method selection window 70 is displayed on one of the first displaying part 11 and the second displaying part 12 by a function selecting key (not illustrated), and the overlap mode is selected in the display method selection window 70, thereby changing the display in the overlap mode.

As illustrated in FIG. 12, the display method selection window 70 includes an item 71 (1. Multi) that selects the multi-mode, and an item 72 (2. Tile) that selects the tiled mode, and an item 73 (3. Overlap) that selects the overlap mode. The display can be changed to the display in the overlap mode illustrated in FIG. 11 by touching the item 73 with a finger.

Thus, the configuration in which the three kinds of the display methods are prepared and easily switched can instantaneously switch the display method to the optimum display method according to the image when an image file selected from a list of files is displayed.

For example, in the case that an image in which a railroad timetable is taken by a camera function is displayed, because possibly part of the railroad timetable becomes invisible in the tiled mode while overlapping the boundary region BR, the overlap mode is selected when the image of the railroad timetable is displayed.

Even if the first displaying part 11 and the second displaying part 12 do not have the touch panel function, the display method selection window 70 may be displayed to select the display method by the function selecting key (not illustrated).

<Correlation with Mounted Application>

The mobile wireless terminal 100 includes various image-related applications such as a still image capturing function (camera function) and a moving image capturing function (movie function). When each application is correlated with one of the three display methods, the correlated display method is automatically selected in performing the application, thereby eliminating the necessity of display method selecting work.

For example, usually the multi-mode is set to a default mode, and the application of the camera function is correlated with the tiled mode. Therefore, the screen becomes the tiled mode when the camera is started, and the screen returns to the multi-mode when the application of the camera function is ended.

Figure 13:
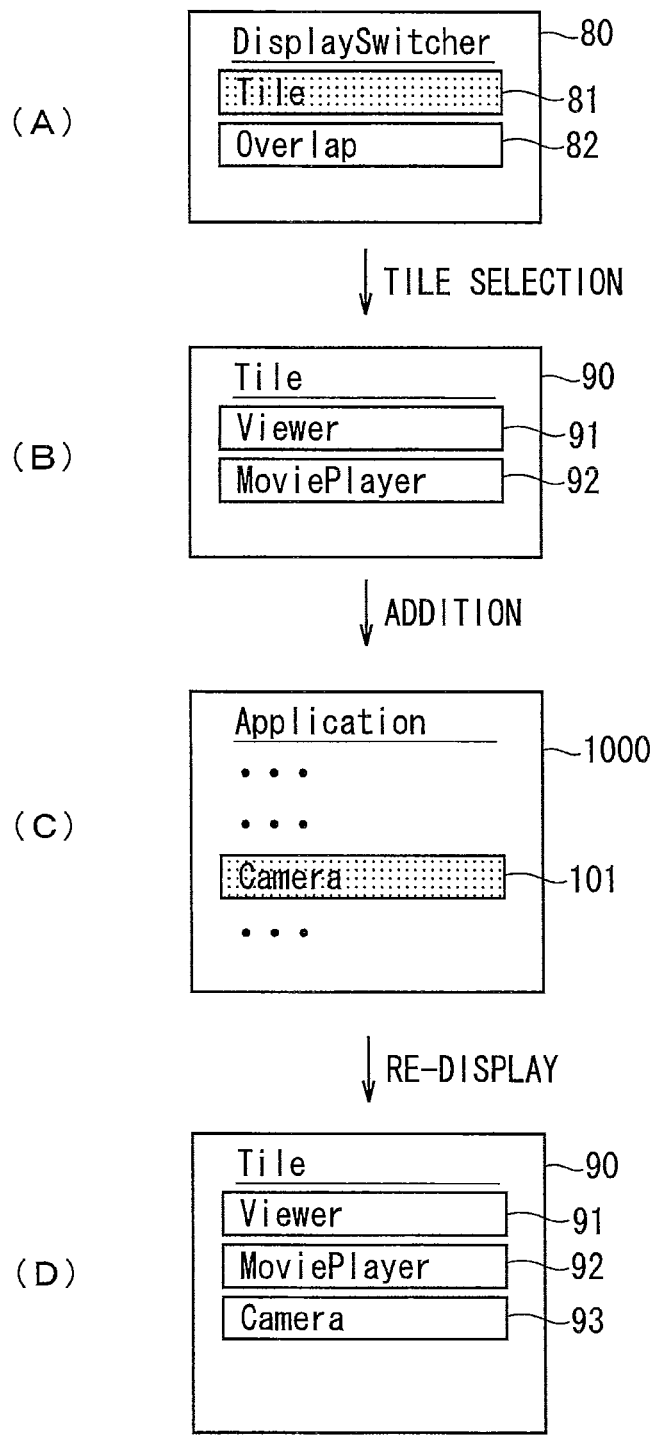
FIG. 13 is a view illustrating a method for correlating an item with an application.

An example of the method for correlating the application with the display mode will be described below with reference to FIG. 13. (A) portion of FIG. 13 illustrates a display method setting window 80 that is displayed on one of the first displaying part 11 and the second displaying part 12 by the function selecting key (not illustrated). The display method setting window 80 includes an item 81 (Tile) that sets the tiled mode and an item 82 (Overlap) that selects the overlap mode.

When the tiled mode is selected, an application display window 90 in which a name of the application correlated with the tiled mode is displayed is displayed as illustrated in (B) portion of FIG. 13. A name 91 (Viewer) of an application of a viewer function that views the stored image and a name 92 (Movie Player) of an application of a movie function are expressed in the application display window 90, and the applications of the viewer function and the movie function are correlated with the tiled mode.

In the case that the application of the camera function is also correlated, an application selection window 1000 in which a list of applications included by the mobile wireless terminal 100 is displayed is opened as illustrated in (C) portion of FIG. 13, and an item 101 (Camera) of the camera function is selected in the application selection window 1000. Alternatively, while the application selection window 1000 and the application display window 90 are simultaneously opened, the item 101 of the camera function may be selected by dragging the item 101 and by moving the item 101 onto the application display window 90.

Therefore, as illustrated in (D) portion of FIG. 13, a name 93 (Camera) of the application of the camera function is displayed in the application display window 90 by newly correlating the camera function with the tiled mode.

<Modification>

In the display example in the overlap mode of FIG. 11, although the lower half of the character string CH near the boundary region BR of the first displaying part 11 is not seen because the character string CH near the boundary region BR is deleted in the correction, the character string CH1 in which the character string CH is completely displayed is displayed near the boundary region BR of the second displaying part 12.

According to the display method of FIG. 11, the character string CH that is only partially read can be read as the character string CH1. However, when the character string CH is read while an overlap point is not understood, possibly the same text is read twice, and a person who reads the character string CH gets confused. The confusion is hardly generated when the text has the large character and the broad space as illustrated in FIG. 11. On the other hand, when the text has the small character and the narrow space in browsing, the overlap point is not understood, and probably the same text is read twice.

Therefore, in the overlap mode, the overlap point is displayed by a visually discriminable method, thereby suppressing the confusion of the person who reads the text. Display examples of the overlap point will be described below with reference to FIGS. 14 to 17.

FIG. 14 illustrates an example in which a character color of the character string CH1 that is displayed in the overlap manner is displayed while changed to a character color different from that of other character strings. Therefore, the overlap point can visually be discriminated to decrease the possibility that reads the same text twice.

FIG. 15 illustrates an example in which a character size of the character string CH1 that is displayed in the overlap manner is displayed while thickened larger than that of other character strings. Therefore, the overlap point can visually be discriminated to decrease the possibility that reads the same text twice. A font may be changed instead of changing the thickness of the character.

FIG. 16 illustrates an example in which the character string CH1 that is displayed in the overlap manner is displayed while shading processing is performed to the character string CH1. That is, a shading region MS is provided such that the character string CH1 is covered therewith, whereby the overlap point can visually be discriminated to decrease the possibility that reads the same text twice.

FIG. 17 illustrates an example in which the character string CH1 that is displayed in the overlap manner is displayed while an underline UL is drawn below the character string CH1. Therefore, the overlap point can visually be discriminated to decrease the possibility that reads the same text twice. An upper line may be drawn instead of the underline.

Any method except the above methods may be adopted as long as the overlap point can visually be displayed.

The visually-discriminable display of the overlap point is implemented by the image processing performed by the controller 130 of FIG. 7, and the description of the image processing is omitted because the image processing can be implemented by a well-known art.

An electronic device according to an embodiment of the present invention includes a plurality of displaying parts and a controller that controls a display of the displaying part, wherein the plurality of displaying parts are arrayed to construct an identical plane, the plurality of displaying parts can be used as one display screen, and the controller includes a display function that displays image data of a region whose width is defined by the predetermined number of pixels in one of displaying parts of one set of displaying parts, which are adjacent to each other with a boundary region interposed therebetween, with respect to the image data on the boundary region where an image cannot be displayed when the plurality of displaying parts are used as one displaying part.

According to the electronic device, the necessary information can be prevented from being invisible behind the boundary region.

In another embodiment of the electronic device of the present invention, the predetermined number of pixels is the number of pixels corresponding to at least the width of the boundary region.

According to the another embodiment of the electronic device, the image data of the region whose width is defined by the number of pixels corresponding to at least the width of the boundary region is displayed while overlapped in the other displaying part, so that the necessary information can be prevented from being invisible behind the boundary region.

In another embodiment of the electronic device of the present invention, the predetermined number of pixels is the number of pixels corresponding to a display size of one character of the character data when the image data on the boundary region is character data.

According to the another embodiment of the electronic device, the image data of the region whose width is defined by the number of pixels corresponding to the display size of one character of the character data is displayed while overlapped in the other displaying part, so that the necessary information can be prevented from being invisible behind the boundary region.

In another embodiment of the electronic device of the present invention, the predetermined number of pixels can be set to any value.

According to the another embodiment of the electronic device, the image data of the region whose width is defined by the arbitrary number of pixels is displayed while overlapped in the other displaying part, so that not only the image having many pieces of character information but also various images can be dealt with.

In another embodiment of the electronic device of the present invention, when the display function is an overlap display function, the controller includes: a multi-display display function that displays the image data on the boundary region in an invisible state when the plurality of displaying parts is used as one displaying parts; a tiled display function that deletes the image data near the boundary region and prevents an extended display of the image in the one set of displaying parts, which are adjacent to each other with a boundary region interposed therebetween; and display method selecting means for selectively switching the overlap display function, the multi-display function, and the tiled display function.

According to the another embodiment of the electronic device, the display method can instantaneously be switched to the optimum display method according to the image.

In another embodiment of the electronic device of the present invention, the display method selecting means is performed by a selector switch.

According to the another embodiment of the electronic device, because the display method can be changed by the selector switch, convenience of a user is improved.

In another embodiment of the electronic device of the present invention, the display method selecting means is performed by a display method selection screen displayed on one of the plurality of displaying parts.

According to the another embodiment of the electronic device, because the display method can be changed by the display method selection screen, it is not necessary to provide the selector switch and the like.

In another embodiment of the electronic device of the present invention, the electronic device includes a plurality of applications relating to an image, and, when a predetermined application is selected, based on a correlation which one of the overlap display function, the multi-display function, and the tiled display function is used with respect to the plurality of applications, the controller automatically selects one of the overlap display function, the multi-display function, and the tiled display function, which is correlated with the selected application.

According to the another embodiment of the electronic device, the necessity of display function selecting work is eliminated.

In another embodiment of the electronic device of the present invention, when the image data of the region whose width is defined by the predetermined number of pixels is character data in performing the display function, the controller displays a character, which is displayed by the character data, by a method for being able to visually discriminate the character from another character.

According to the another embodiment of the electronic device, the overlap point can visually be discriminated to decrease a possibility that the same text is read twice.

While the invention has been shown and described in detail, the foregoing description is in all aspects illustrative and not restrictive. It is therefore understood that numerous modifications and variations can be devised without departing from the scope of the invention.

What is claimed is:

1. An electronic device comprising:
a plurality of display screens configured to be positioned in an identical plane, wherein, when the plurality of display screens are positioned in the identical plane, a boundary region is disposed between a first one of the plurality of display screens and a second one of the plurality of display screens; and
a controller that, when in an overlap display mode, displays data across the first display screen and the second display screen in an overlapping manner such that a portion of the data displayed on a region of the first display screen nearest the boundary region is also displayed on a region of the second display screen nearest the boundary region.

2. The electronic device according to claim 1, wherein the portion of the data has a width of a predetermined number of pixels.

3. The electronic device according to claim 2, wherein the predetermined number of pixels is the number of pixels corresponding to at least the width of the boundary region.

4. The electronic device according to claim 2, wherein the predetermined number of pixels is the number of pixels corresponding to a display size of one character.

5. The electronic device according to claim 2, wherein the predetermined number of pixels can be set to any value.

6. The electronic device according to claim 1, wherein the controller is configured to switch a display mode of the first display screen and the second display screen between:
a multi-mode display mode in which the data is divided across the first display screen and the second display screen such that a portion of the data displayed on a region of the first display screen nearest the boundary region and a portion of the data displayed on a region of the second display screen nearest the boundary region are continuous;

a tiled display mode in which the data is displayed across the first display screen and the second display screen such that a portion of the data, equal to a width of the boundary region and positioned between a portion of the data displayed on a region of the first display screen nearest the boundary region and a portion of the data displayed on a region of the second display screen nearest the boundary region, is not displayed; and the overlap display mode.

7. The electronic device according to claim 6, wherein the controller switches the display mode in response to operation of a selector switch.

8. The electronic device according to claim 6, wherein the controller switches the display mode in response to a user selection on a selection screen displayed on one of the plurality of display screens.

9. The electronic device according to claim 6, wherein the controller automatically selects one of the multi-mode display mode, the tiled display mode, and the overlap display mode based on an application being executed on the electronic device.

10. The electronic device according to claim 1, wherein, when the portion of data displayed on both the first display screen and the second display screen comprises characters, the characters in the portion of data displayed on the second display screen are visually distinguished from the characters in the portion of data displayed on the first display screen.

11. The electronic device according to claim 10, wherein the characters in the portion of data displayed on the second display screen are displayed in a different color than the characters in the portion of data displayed on the first display screen.

12. The electronic device according to claim 10, wherein the characters in the portion of data displayed on the second display screen are displayed in a different thickness than the characters in the portion of data displayed on the first display screen.

13. The electronic device according to claim 10, wherein the characters in the portion of data displayed on the second display screen are shaded.

14. The electronic device according to claim 10, wherein the characters in the portion of data displayed on the second display screen have an underline under the characters or an upper line above the characters.

* * * * *